United States Patent
Szabo et al.

(10) Patent No.: US 10,244,550 B2
(45) Date of Patent: Mar. 26, 2019

(54) TECHNIQUE FOR SCHEDULING TRANSMISSION OF CONTENT IN AN ACCESS NETWORK

(71) Applicant: Telefonaktiebolaget LM Ericsson (publ), Stockholm (SE)

(72) Inventors: Geza Szabo, Kecskemet (HU); Sándor Rácz, Cegléd (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/564,241

(22) PCT Filed: Apr. 23, 2015

(86) PCT No.: PCT/EP2015/058795
§ 371 (c)(1),
(2) Date: Oct. 4, 2017

(87) PCT Pub. No.: WO2016/169600
PCT Pub. Date: Oct. 27, 2016

(65) Prior Publication Data
US 2018/0132262 A1    May 10, 2018

(51) Int. Cl.
*G01R 31/08* (2006.01)
*H04W 72/12* (2009.01)
(Continued)

(52) U.S. Cl.
CPC ..... *H04W 72/1242* (2013.01); *H04L 63/0428* (2013.01); *H04W 12/02* (2013.01);
(Continued)

(58) Field of Classification Search
CPC .............................................. H04W 72/1242
See application file for complete search history.

(56) References Cited

U.S. PATENT DOCUMENTS 6,317,781 B1 * 11/2001 De Boor ........... G06F 17/30884
709/217
6,637,031 B1 * 10/2003 Chou ................. H04N 7/17336
348/384.1
(Continued)

FOREIGN PATENT DOCUMENTS

WO    2005101885 A1    10/2005
WO    2010088490 A1    8/2010

OTHER PUBLICATIONS

Bevan, Nigel , "Human-Computer Interaction Standards", Proceedings of the 6th International Conference on Human Computer Interaction, Jul. 1995, 1-8.
(Continued)

*Primary Examiner* — Gerald A Smarth
(74) *Attorney, Agent, or Firm* — Sage Patent Group (57) ABSTRACT

A technique for enhancing presentation of content comprising a plurality of objects in an access network (201) is disclosed. An object scheduler (2002) for scheduling transmission of content in an access network (201) comprises at least one memory storing program code and at least one processor configured to execute the program code. The content is provided for download to a user equipment, UE, (2001) from a content server. The program code is configured to cause the processor to schedule (S2-2), in response to receipt (S2-1) of a privilege request from the UE (2001) requesting privileged transmission of content comprising a plurality of objects, transmission of the plurality of objects to the UE (2001), and to trigger transmission (S2-3) of the scheduled plurality of objects to the UE (2001). At least a portion of the plurality of objects is scheduled with a higher priority than a default priority assigned by the object scheduler (2002) to the UE (2001).

18 Claims, 4 Drawing Sheets

(51) Int. Cl.
*H04L 29/06* (2006.01)
*H04W 12/02* (2009.01)
*H04W 28/02* (2009.01)

(52) U.S. Cl.
CPC ... *H04W 28/0215* (2013.01); *H04W 28/0268* (2013.01); *H04W 72/1247* (2013.01); *H04L 63/0272* (2013.01)

(56) References Cited

U.S. PATENT DOCUMENTS

| | | | | |
|---|---|---|---|---|
| 8,694,465 | B2* | 4/2014 | O'Farrell | G06F 8/61 707/621 |
| 2001/0037461 | A1* | 11/2001 | Conrath | H04L 63/083 726/7 |
| 2007/0011193 | A1* | 1/2007 | Coker | G06F 17/30607 |
| 2009/0132636 | A1* | 5/2009 | Natanzon | G06F 19/321 709/201 |
| 2011/0264676 | A1* | 10/2011 | Belan | G06F 17/30784 707/756 |
| 2014/0334309 | A1 | 11/2014 | Mihaly et al. | |

OTHER PUBLICATIONS

Piamrat, Kandaraj et al., "QoE-Aware Scheduling for Video-Streaming in High Speed Downlink Packet Access", 2010 IEEE Wireless Communications and Networking Conference (WCNC), Sydney, Australia, Apr. 18-21, 2010, 1-6.
Unknown, Author, "HTTP Archive", http://www.HTTPArchive.org, 1-7.
Unknown, Author, "PageSpeed Module", Google Developers https://developers.google.com/speed/pagespeed/module, 1-2.
Unknown, Author, "The Chromium Projects", http://www.chromium.org/blink, 1-10.
Wang, Xiao S. et al., "Demystifying Page Load Performance with WProf", In Proceedings of the 10th USENIX conference on Networked Systems Design and Implementation (NSDI'13), Apr. 2-5, 2013, 1-13.

* cited by examiner

TECHNIQUE FOR SCHEDULING TRANSMISSION OF CONTENT IN AN ACCESS NETWORK

TECHNICAL FIELD

The present disclosure generally relates to scheduling of content transmission via an access network to enhance presentation of the content on a user equipment. The technique of the present disclosure may be embodied in apparatuses, methods and computer programs.

BACKGROUND

The average size and complexity of content such as web pages have constantly been growing. For instance, an average web page has over 100 objects and is approximately 1,200 Kbyte in size today. The rendering of such a voluminous web page is a resource consuming task causing heavy load on the user equipment (UE hereinafter). Moreover, the load times for such web pages can amount to 5 seconds and more (e.g., with a 10 Mbps connection and a modern Personal Computer, PC). It is evident that such load times significantly reduce the Quality of Experience (QoE) from a user perspective (e.g., in terms of start of web page rendering). As such, the web page load time is a key performance indicator (KPI) for user QoE, and thus many approaches aim to reduce this KPI.

The two main factors that a web page load time depends on is the CPU performance of the UE (in terms of computational time) and network capacity (in terms of load time). The potential of the enhancing either of these two factors has already been analyzed. In this regard, the following gains have been estimated: a) when computational time is reduced to zero but the network load time remains unchanged, the web page load time is reduced by 20%; conversely, b) when the network load time is reduced to one fourth, but the computational time remains unchanged, the page load time is reduced by 45%.

With an eye to a satisfactory QoE, a start rendering time ranging from 1 to 2 seconds has been recommended. This is because giving the user visual feedback that something is happening shows the user that the UE is in fact responsive. The user can plan, anticipate and adjust himself/herself to consistent response times when browsing web pages. The user can also already start browsing when most of the information of the web page (i.e., the textual content) has been rendered, while large pictures are still downloaded in the background.

The start rendering time is typically composed of a Time to First Byte (TTFB) connect time, a server response time, a time for processing objects in the head of the page, a time for initial page parsing and a time for rendering. Optimizing the start rendering time is a matter of optimizing one or more of these delay components.

There are several possible aspects to overcome unnecessarily long start rendering times. One aspect pertains to new protocols to improve Roundtrip Time (RTT) and introduces prioritization of objects (e.g., SPeeDY, SPDY, and Quick User Datagram Protocol, UDP, Internet Connections, QUIC). Another aspect focuses on server-side optimization of the content by modules like mod_pagespeed. Moreover, a still further aspect relates to client side methods like caching, prefetching and preloading.

Today, most operators apply so called "middle boxes" with Deep Packet Inspection (DPI) to introduce traffic differentiation in the network for Internet traffic and to thus enhance user QoE. However, commonly applied end-to-end encryption (as implemented, e.g., in SPDY and QUIC) prevents the support of any kind of QoE enhancement on the last hop of such traffic.

In the example of a wireless communication scenario, end-to-end encryption thus makes it impossible for any intermediate component to be aware of the objects that are transferred through the radio access network. Thus, current DPI techniques cannot support the radio access network with the necessary information, and middle boxes are banned out from the route by design of, for example, QUIC.

Over-the-top (OTT) application providers are thus introducing other ways to improve QoE. For instance, to improve web rendering time, prioritization of web requests in requests and responses in the QUIC protocol has been introduced. QUIC uses end-to-end encryption (which is expected for most traffic in the future) and multiplexing, so supporting per flow prioritization requested by the application in the network is a challenging problem although it would enhance end-user QoE even further.

SUMMARY

Accordingly, there is a need for a technique that avoids one or more of the problems discussed above, or other problems.

In a first aspect, there is provided an object scheduler for scheduling transmission of content in an access network, wherein the content is provided for download to a user equipment, UE, from a content server, the object scheduler comprising at least one memory storing program code, and at least one processor configured to execute the program code, wherein the program code is configured to cause the processor to schedule, in response to receipt of a privilege request from the UE requesting privileged transmission of content comprising a plurality of objects, transmission of the plurality of objects to the UE, wherein at least a portion of the plurality of objects is scheduled with a higher priority than a default priority assigned by the object scheduler to the UE, and trigger transmission of the scheduled plurality of objects to the UE.

In all the aspects presented herein, the access network may be a radio access network or a network for wireline network access. The radio access network may be a cellular or non-cellular network. The UE may be any stationary or mobile user terminal (e.g., a smartphone, tablet computer, laptop computer, PC, etc.). The content server may be a web server, media server, application server or any other type of server providing content for download.

In all the aspects presented herein, the content may comprise at least one of displayable content and non-displayable content. Displayable content may be a web page, for example. In this case, QoE is increased especially for web browsing and the start presentation time referred to above is the start rendering time of the web page. Non-displayable content, on the other hand, may be audio content, for example.

In all the aspects presented herein, the privilege request may include at least one of information on a presentation status of the content in the UE and information on a loading status of the content in the UE. The presentation status may indicate that presentation of the content on the UE has already started or that presentation of the content on the UE has not yet started. The loading status may indicate that the UE has not yet started loading the content ("uninitialized" state), that the UE is currently loading the content ("loading" state), that the content has been loaded ("loaded" state), that the UE has loaded the content enough so that the user can interact with the content ("interactive" state), or that the UE has fully initialized the content ("complete" state). If the content is a web page, the presentation status may correspond to the rendering status of the web page on the UE and the loading status may correspond to the "readyState" property of an HTML/XHTML document object in the Document Object Model (DOM).

In one implementation, the program code may be configured to cause the processor to schedule the plurality of objects based on at least one of the presentation status and the loading status included in the privilege request. In some variants, the object scheduler may decide depending on at least one of the presentation status and the loading status whether and to which extent a higher priority may be assigned to a portion of the plurality of objects of the content to be transmitted.

The portion of the plurality of objects that is scheduled with a higher priority may be the first portion of the plurality of objects of the content that is transmitted to the UE after the privilege request is received. In particular, the privilege request may be received prior to transmission of a first object out of the plurality of objects of the content. In this case, the portion of the plurality of objects that is scheduled with a higher priority may be the first portion of the plurality of objects of the content that is transmitted to the UE. Also, for each object in the portion of the plurality of objects that is scheduled with a higher priority, the same priority may be assigned.

The program code may be configured to cause the processor to schedule a remaining portion of the plurality of objects with the default priority (or even a lower priority). In this respect, the program code may be configured to cause the processor to schedule the remaining portion of the plurality of objects with the default (or a lower) priority in response to receipt of a termination request from the UE requesting termination of the privileged transmission of the content.

Alternatively, or in addition, the program code may be configured to cause the processor to schedule the remaining portion of the plurality of objects with the default (or a lower) priority not until a predetermined minimum period of time has elapsed after receiving the privilege request. In this way, it may in certain variants be guaranteed that a boosted period lasts for at least a predetermined amount of time.

Still alternatively, or in addition, the program code may be configured to cause the processor to schedule the remaining portion of the plurality of objects with the default (or a lower) priority when a predetermined maximum period of time has elapsed after receiving the privilege request. In this way, it may in some variants be guaranteed that a boosted period does not exceed a predetermined amount of time. This may ensure that a fair share of available transmission resources among a plurality of UEs in the access network is provided.

In a refinement of the first aspect, the program code may further be configured to cause the processor to obtain the privilege request from one of a dedicated socket between the UE and the object scheduler, a Type of Service, ToS, field of IP packets sent by the UE, and radio signalling via Minimization of Drive Tests, MDT. The privilege request and the information included therein may be communicated via any one of these implementations.

In a further refinement of the first or any other aspect, the objects may be comprised in data traffic. The data traffic may be encrypted. The encryption may be an end-to-end encryption (e.g., between the UE and a content server or between the UE and another UE). In this way, on the one hand, integrity and security of encrypted data traffic can be ascertained. On the other hand, the imminent transition to such end-to-end encryption may be facilitated.

In still a further refinement of the first or any other aspect, the UE may be one out of plural UEs, and all UEs may compete for a common shared radio resource in one cell of a cellular communication network. In such a case, the access network may thus belong to the cellular communication network.

In a second aspect, there is provided a user equipment, UE, for enhancing presentation of content, the UE comprising at least one presentation interface, at least one memory storing program code, and at least one processor configured to execute the program code, wherein the program code is configured to cause the processor to trigger sending of a download request to a content server requesting download of a content comprising a plurality of objects, trigger sending of a privilege request to an object scheduler of an access network requesting privileged transmission of the content, and present the received content via the presentation interface, wherein at least a portion of the plurality of objects is received with a higher priority than a default priority assigned by the object scheduler to the UE.

As said, the content may comprise at least one of displayable content and non-displayable content. Displayable content may be a web page, for example. For displayable content, the at least one presentation interface may comprise a display screen of the UE and, for non-displayable content, the at least one presentation interface may comprise a speaker of the UE.

In one implementation, the program code may be configured to cause the processor to trigger sending of the privilege request immediately with the download request (e.g., substantially at the same time as the download request). Since the privilege request typically arrives faster at the object scheduler than the downloaded objects from the content server, this may in some variants ensure that the portion of the plurality of objects that is received with a higher priority is in fact the first portion of the plurality of objects of the content that is received by the UE.

Alternatively, the program code may be configured to cause the processor to trigger sending of the privilege request before the start presentation time of the content and, still alternatively, the program code may be configured to cause the processor to trigger sending of the privilege request at the start presentation time of the content if the loading status of the content is not yet in the "interactive" state. The latter case may specifically be directed to enabling user interaction as quickly as possible once presentation of the content has already started.

The program code may further be configured to cause the processor to trigger sending of a termination request to the object scheduler requesting termination of the privileged transmission of the content. In particular, the program code may be configured to cause the processor to trigger sending of the termination request once the loading status of the content has reached the "interactive" state. Since the user may interact with the content from this point on, privileged transmission may end and the object scheduler may prioritize transmission resources to other UEs in the network.

The program code may further be configured to cause the processor to trigger sending of the termination request not until a predetermined minimum period of time has elapsed after sending the privilege request. This may in certain cases guarantee that a boosted period lasts for at least a predetermined amount of time.

Alternatively, or in addition, the program code may be configured to cause the processor to trigger sending of the termination request when a predetermined maximum period of time has elapsed after sending the privilege request. This may in certain cases guarantee that a boosted period does not exceed a predetermined amount of time and may support the object scheduler in that a fair share of available transmission resources among a plurality of UEs in the access network is provided.

In either of these (or other) cases, a remaining portion of the plurality of objects may be received with the default (or even a lower) priority.

In a refinement of the second aspect, the program code may further be configured to cause the processor to trigger sending the privilege request in one of a dedicated socket between the UE and the object scheduler, a Type of Service, ToS, field of IP packets sent by the UE, and radio signalling via Minimization of Drive Tests, MDT. The privilege request and the information included therein may be communicated via any one of these implementations.

In a third aspect, there is provided a system comprising the object scheduler of the first aspect and at least one UE of the second aspect.

In a fourth aspect, there is provided a method for scheduling transmission of content, the method being performed in an object scheduler of an access network and comprising receiving a privilege request from a user equipment, UE, requesting privileged transmission of a content comprising a plurality of objects, the content being downloaded to the UE from a content server, scheduling the plurality of objects to be transmitted to the UE, wherein at least a portion of the plurality of objects is scheduled with a higher priority than a default priority assigned by the object scheduler to the UE, and transmitting the scheduled plurality of objects to the UE.

In a fifth aspect, there is provided a method for enhancing presentation of content, the method being performed in a user equipment, UE, and comprising sending a download request to a content server requesting download of a content comprising a plurality of objects, sending a privilege request to an object scheduler of an access network requesting privileged transmission of the content, receiving the content, wherein at least a portion of the plurality of objects is received with a higher priority than a default priority assigned by the object scheduler to the UE, and presenting the content.

It is to be noted that the apparatus features described herein with reference to the first and second aspects may also be embodied as functions, services or steps in the methods of the fourth and fifth aspects.

In a sixth aspect, there is provided a computer program product comprising program code portions for performing the method of at least one of the fourth and fifth aspect when the computer program product is executed on one or more computing devices. The computer program product may be stored on a computer readable recording medium, such as a semiconductor memory, DVD, CD-ROM, and so on. The computer program product may also be provided for download via a communication network (e.g., the Internet or a proprietary network).

BRIEF DESCRIPTION OF THE DRAWINGS

Embodiments of the technique presented herein are described herein below with reference to the accompanying drawings, in which.

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practiced in other embodiments that depart from these specific details. For example, the embodiments will partially be described in the context of $3^{rd}$ generation (3G) or $4^{th}$ generation/long term evolution (4G/LTE) access networks. However, this does not rule out the use of the present technique in connection with (future) technologies consistent with 3G or 4G/LTE, be it a wirebound communications network or a wireless communications network. On the other hand, the present technique may also be backward-compatible to a degree described herein below.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that when the following embodiments are described in the context of methods and method steps, the technique presented herein may also be embodied in a computer program product as well as in a system comprising a computer processor and a memory coupled to the processor, wherein the memory is encoded with one or more programs that execute the services, functions and steps disclosed herein.

Some of the following embodiments exemplarily focus on a mobile broadband environment in which users share a common radio resource in a cell of a radio access network. In this environment, the main issue that reduces QoE (also in terms of the start presentation time) is the competition between the users on the radio bottleneck on the last mile of the connection that none of the prior art approaches is designed to relax in particular. Some of the following embodiments demonstrate QoE enhancement possibilities with the cooperation of the access network and the UE to overcome the radio bottleneck.

Some of the embodiments focus on the QoE enhancement with an eye to the start presentation time KPI. The start presentation time is the moment at which a first portion of content to be downloaded is presented to the user via a presentation interface of the UE.

Without loss of generality, in some of the embodiments, the proposed solution may gather information on at least one of the presentation status and the loading status of the content to be downloaded at the client side and transfers it with a privilege request toward the access network. An object scheduler in the access network can then do the traffic scheduling ("boosting") accordingly. The issue of potentially encrypted traffic is thus avoided by gathering information at the client side, which is fully aware of the content. Only information on the presentation status and the loading status of the content is gathered and communicated to the network node, which does not harm any privacy considerations.

In case of the content being a web page, the start rendering time for rendering the web page, as used herein, may depend on one or more of a TTFB connect time, a server response time, a time for processing objects in the head of the page, a time for initial page parsing and a time for rendering. It is evident that reducing the duration of one or more of those operations will also decrease the start rendering time as a whole.

Figure 1:
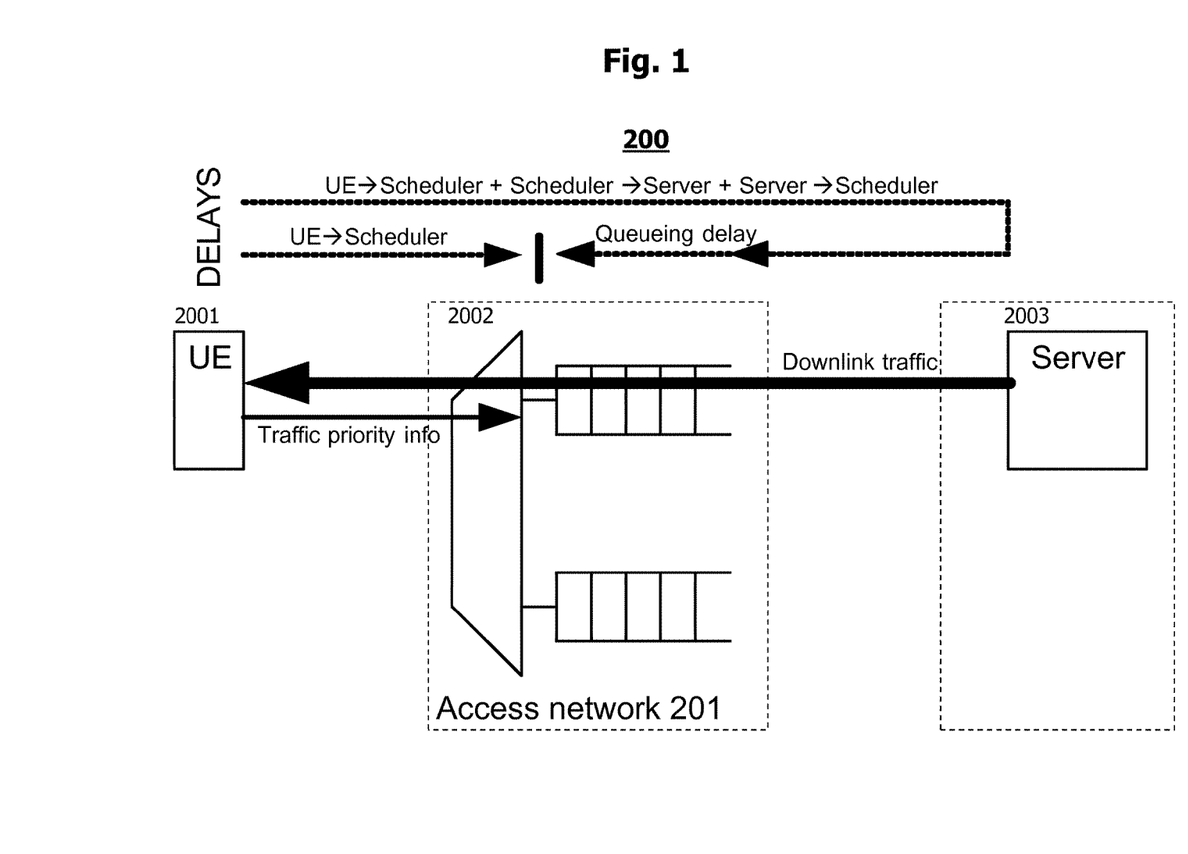
FIG. 1 shows a principle of a communications network and components involved in which embodiments of the present disclosure may be performed.

FIG. 1 shows an embodiment of a communications network 200 in which aspects of the present disclosure may be performed. The communications network 200 comprises at least one UE 2001 (typically a large number of UEs), an access network 201 (e.g., a cellular radio access network) and a content server 2003 (e.g., a web or media server). In turn, the access network 201 comprises an access network node with an object scheduler 2002. The access network node may take the form of a radio base station (e.g., a NodeB or an eNodeB) or a Radio Network Controller (RNC).

In FIG. 1, the signalling delay of the communications network 200 is illustrated. It is shown that the reaction time for signalling priority information (such as a privilege request as described herein) is very low (e.g., it may be completed within 1 to 2 RTTs). This short reaction time is the result of the fact that priority information (thinner arrow from the UE 2001 towards the object scheduler 2002) arrives much faster at the object scheduler 2002 than the served objects (thicker arrow) from the content server 2003. This short reaction time can thus be exploited for "boosting" the start presentation time of downloaded content (e.g., web pages or other multi-object media) at the UE 2001. Such "boosting" will even result for end-to-end encrypted traffic since it can be performed without DPI at the object scheduler 2002 in the access network 201.

In some of the embodiments, the communication between the object scheduler 2002 and the UE 2001 to convey the privilege request and information included therein may be performed (without being limited thereto) on a dedicated socket between the UE 2001 and the scheduler 2002, in the ToS field of the IP packets sent by the UE 2001, or via radio signalling e.g., via MDT.

Figure 2:
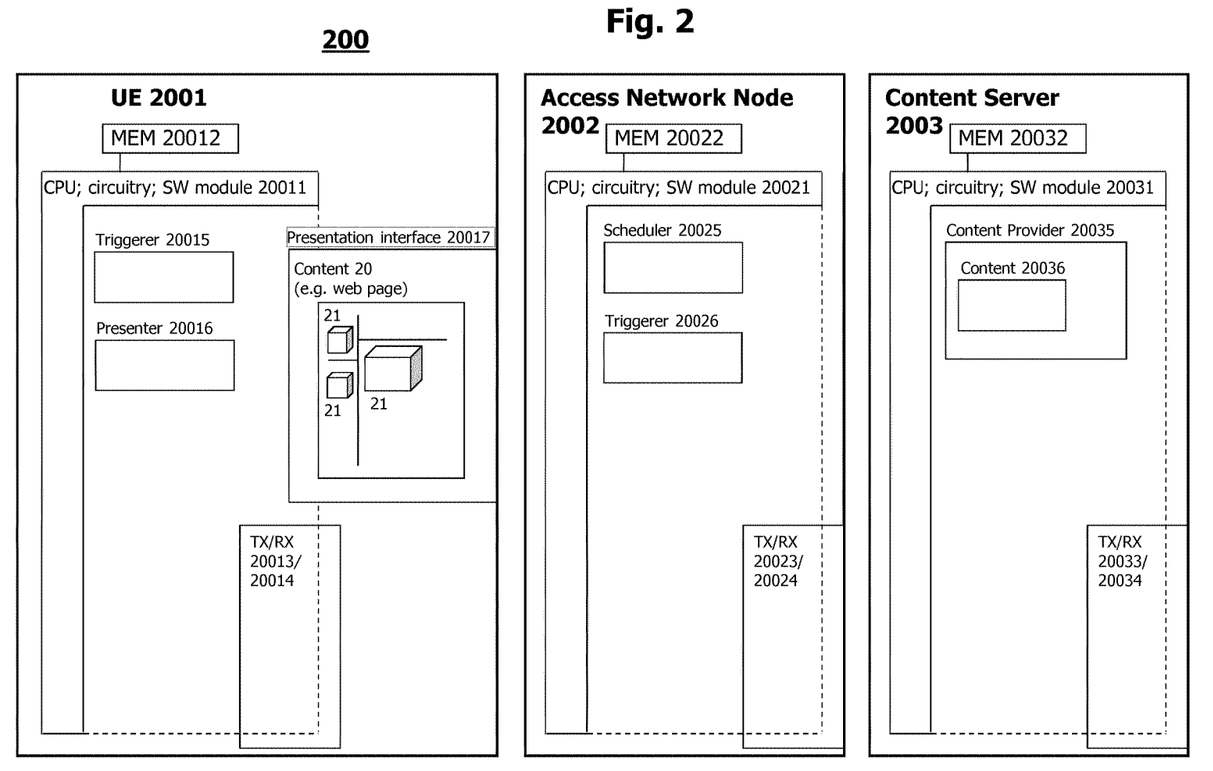
FIG. 2 shows components comprised in exemplary device embodiments realized in the form of apparatuses (which may reside in a UE and an access network node that comprises an object scheduler or a content server)

FIG. 2 shows components comprised in an exemplary device embodiment realized in the form of the UE 2001, the access network node (implementing the object scheduler) 2002 and the content server 2003.

As shown in FIG. 2, the UE 2001 comprises a core functionality (e.g., one or more of a CPU, dedicated circuitry and/or a software module) 20011, a memory (and/or database) 20012, a transmitter 20013 and a receiver 20014. Moreover, the UE 2001 comprises a triggerer 20015, a presenter 20016 and one or more presentation interfaces 20017 for presentation of content 20 comprising a plurality of objects 21. A presentation interface 20017 may comprise a display unit for presentation of displayable content, such as web pages. A presentation interface 20017 may also comprise a speaker unit for presentation of non-displayable content, such as audio content. The UE may take the form of any wireless or wirebound user terminal, such as a smartphone, a tablet computer or a PC.

In a similar manner, the access network node 2002 (implementing the object scheduler, see FIG. 1) comprises a core functionality (e.g., one or more of a CPU, dedicated circuitry and/or a software module) 20021, a memory (and/or database) 20022, a transmitter 20023 and a receiver 20024. Moreover, the object scheduler 2002 comprises a scheduler 20025 and a triggerer 20026.

Finally, the content server 2003 comprises a core functionality (e.g., one or more of a CPU, dedicated circuitry and/or a software module) 20031, a memory (and/or database) 20032, a transmitter 20033 and a receiver 20034. Moreover, the content server 2003 comprises a content provider 20035 for providing content 20036.

In the following paragraphs, index "x" equals 1, 2 or 3 (for the UE 2001, the object scheduler 2002 and the content server 2003). As partly indicated by the dashed extensions of the functional blocks of the CPUs 200x1, the triggerer 20015, the presenter 20016 (of the UE 2001), the scheduler 20025, the triggerer 20026 (of the access network node with the object scheduler 2002) and the content provider 20035 (of the content server 2003) as well as the memories 200x2, the transmitters 200x3 and the receivers 200x4 may at least partially be functionalities running on the CPUs 200x1, or may alternatively be separate functional entities or means controlled by the CPUs 200x1 and supplying the same with information. The transmitter and receiver components 200x3, 200x4 may be realized to comprise suitable interfaces and/or suitable signal generation and evaluation functions.

The CPUs 200x1 may be configured using software residing in the memories 200x2, to process various data inputs and to control the functions of the memories 200x2, the transmitters 200x3 and the receivers 200x3 (as well as of the triggerer 20015, the presenter 20016 (of the UE 2001), the scheduler 20025, the triggerer 20026 (of the object scheduler 2002) and the content provider 20035 (of the content server 2003)). The memories 200x2 may serve for storing program code for carrying out the methods and method steps according to the aspects disclosed herein, when executed by the CPUs 200x1.

It is to be noted that the transmitters 200x3 and the receivers 200x4 may be provided as integral transceivers, as is indicated in FIG. 2. It is further to be noted that the transmitters/receivers 200x3, 200x4 may be implemented as physical transmitters/receivers for transceiving via an air interface or a wired connection, as routing/forwarding entities/interfaces between network elements, as functionalities for writing/reading information into/from a given memory area or as any suitable combination of the above. At least one of the triggerer 20015, the presenter 20016 (of the UE 2001), the scheduler 20025, the triggerer 20026 (of the object scheduler 2002) and the content provider 20035 (of the content server 2003), or the respective functionalities, may also be implemented as a chipset, module or subassembly.

Figure 3:
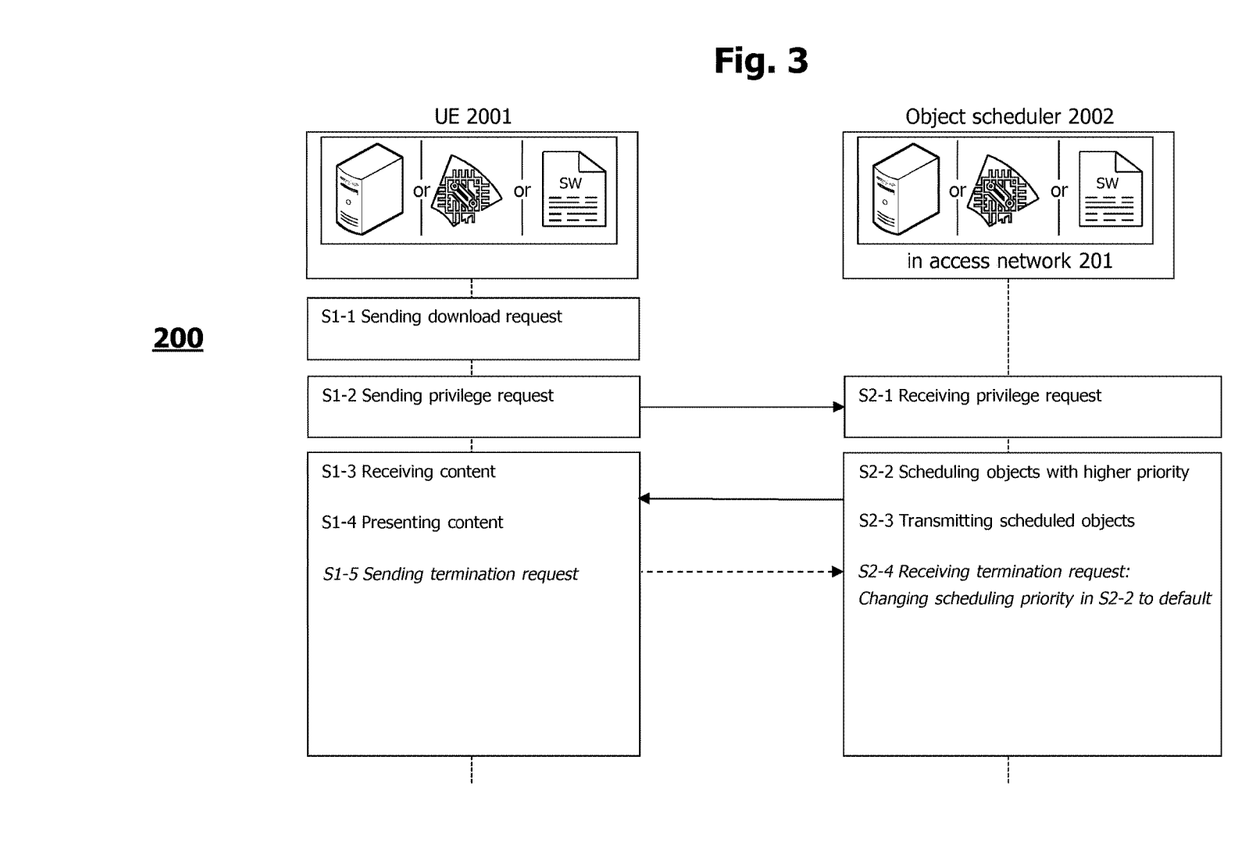
FIG. 3 shows a method embodiment which reflects an exemplary interaction between the components of the apparatus embodiments.

FIG. 3 shows a method embodiment which reflects an exemplary interaction between the components of the device embodiment shown in FIG. 2. In the signalling diagram of FIG. 3, time aspects between signalling are reflected in the vertical arrangement of the signalling sequence as well as in the sequence numbers. Method steps which are contained within the same box of the diagram, however, do not necessarily have to be executed in the particular sequence indicated and may, at least partly, be executed concurrently as will be explained in more detail below.

In step S1-1, the triggerer 20015 of the UE 2001 triggers sending of a download request via the transmitter 20013 to the content server 2003 (not shown in the diagram of FIG. 3) requesting download of a content 20 comprising a plurality of objects 21. For the purpose of this illustration, it will be assumed that the content 20 is a web page. It will be understood, however, that the illustrated example may be practiced with any other type of multi-object content. In this case, the triggerer 20015 may be part of a web browser, web browser engine, web-browser plug-in or another dedicated application. For example, the triggerer 20015 may be the web browser engine "Blink" of the open-source Chromium browser. The Blink engine may implement the Document:: readyState( ) property of an HTML/XHTML document object as referred to herein. The content server 2003 may be a web server or application server providing the web page 20 (as part of the content 20036) for download via its content provider component 20035. Upon receiving the download request from the UE 2001, the content server 2003 begins transmitting the web page 20 to the UE 2001. Transmission of the web page 20 through the access network 201 is scheduled by the object scheduler 2002.

In step S1-2, the triggerer 20015 of the UE 2001 triggers sending of a privilege request via the transmitter 20013 to the object scheduler 2002 indicating that privileged transmission of the web page 20 is desired. In the illustrated example, the privilege request is sent shortly after the download request but before receipt of a first portion of the web page 20. Transmission of the privilege request may be performed (without being limited thereto) on a dedicated socket between the UE 2001 and the scheduler 2002, in the ToS field or any other field of the IP packets sent by the UE 2001, or via radio signalling e.g., via MDT. In step S2-1, the object scheduler 2002 receives the privilege request from the UE 2001 via the receiver 20024.

As to the format of the privilege request, the privilege request may include information on the current rendering status of the web page 20 in the UE 2001 and information on the loading status of the web page 20 in the UE 2001. In the illustrated example, since the privilege request is sent shortly after the download request, the rendering status may indicate that rendering has not yet started and the loading status may indicate that the UE 2001 is in the "loading" state.

In step S2-2, as soon as a first portion of the objects 21 of the web page 20 has arrived at the object scheduler 2002 from the content server 2003, the scheduler 20025 of the object scheduler 2002 begins scheduling transmission of the arrived objects 21 to the UE 2001. The scheduler 20025 may take the form of a weighted fair queue scheduler which schedules objects to be transmitted (in fact to a plurality of UEs competing for transmission resources in the access network 201) in accordance with their pre-assigned priorities. Due to the privilege request received from the UE 2001, the objects 21 of the web page 20 receive a higher priority than a default priority normally assigned to objects transmitted to the UE 2001. The objects 21 of the web page 20 thus receive a higher weight in the weighted fair queue which effectively results in a higher bandwidth allocated to transmitting the objects 21 to the UE 2001.

Further, in step S2-3, the triggerer 20026 of the object scheduler 2002 triggers transmission of the scheduled objects 21 to the UE 2001 via the transmitter 20023. It will be understood that steps S2-2 and S2-3 are not necessarily performed sequentially with respect to all objects 21 constituting the web page 20 (i.e., scheduling all objects 21 of the web page 20 in a single step S2-2 and transmitting all objects 21 of the web page 20 thereafter in another single step S2-3). In fact, steps S2-2 and S2-3 may be performed concurrently in the sense that one portion of objects 21 of the web page 20 may be in transmission in step S2-3 while a subsequent portion of objects 21 of the web page 20 is being scheduled for subsequent transmission in step S2-2 at the same time.

In step S1-3, the UE 2001 receives the objects 21 of the web page 20 transmitted from the object scheduler 2002 via the receiver 20014. The received objects 21 may include rendering-blocking objects and non-rendering-blocking objects. Rendering-blocking objects are such types of objects that potentially block rendering of the web page (e.g., main HTML pages, CSS style sheets, JS files). Non-rendering-blocking objects, on the other hand, may be loaded at a later point of time and do not block the rendering of the web page (e.g., images or certain types of media objects).

In step S1-4, once all rendering-blocking objects 21 of the web page 20 are received by the UE 2001, the presenter 20016 of the UE 2001 starts rendering the web page 20 via the presentation interface 20017, thus giving a first feedback to the user of the UE 2001. The presenter 20016 may e.g. take the form of a web browser rendering engine which parses the received objects 21 and renders the web page 20 accordingly. It will be understood that that steps S1-3 and S1-4 are not necessarily performed sequentially with respect to all objects 21 constituting the web page 20 (i.e., receiving all objects 21 of the web page 20 in a single step S1-3 and rendering all objects 21 of the web page 20 thereafter in another single step S1-4). In fact, steps S1-3 and S1-4 may be performed concurrently in the sense that one portion of objects 21 of the web page 20 is rendered in step S1-4 while a subsequent portion of objects 21 of the web page 20 is being received in step S1-3 at the same time.

By scheduling transmission of the objects 21 with a higher priority than the default priority in step S2-2, transmission of the web page 20 as a whole is accelerated ("boosted"). Particularly, the start rendering time of the web page 20 (i.e., the moment at which a first portion of the web page 20 is displayed to the user of the UE) may be reduced and the user may be given a quicker feedback providing evidence that the UE is in fact responsive and that a requested download is in progress. In this way, the user of the UE is experiencing increased QoE.

In an optional step S1-5, while receiving of the objects 21 and rendering thereof according to steps S1-3 and S1-4 is still ongoing, the triggerer 20015 of the UE 2001 triggers sending of a termination request via the transmitter 20013 to the object scheduler 2002 requesting termination of the privileged transmission of the web page 20. The termination request may be sent, for example, once the loading status of the web page 20 has reached the "interactive" state, i.e., as soon as the user may interact with the web page 20.

In a corresponding optional step S2-4, the object scheduler 2002 receives the termination request from the UE 2001 via the receiver 20024. Upon receiving the termination request, the scheduler 20025 of the object scheduler 2002 changes the priority assigned for the remaining objects 21 of the web page 20 to be transmitted to the UE 2001 to the default (or even a lower) priority. Accordingly, in the ongoing scheduling activity according to step S2-2, the remaining portion of the objects 21 of the web page 20 is scheduled with the default (or lower) priority. The objects 21 of the web page 20 thus receive a lower weight in the weighted fair queue which effectively results in a lower bandwidth allocated to transmitting the remaining objects 21 to the UE 2001. Thus, privileged transmission for the UE 2001 ends and the object scheduler 2002 is free to prioritize transmission for other UEs in the network.

Steps S2-2 and S2-3 (on the side of the object scheduler 2002) as well as steps S1-3 and S1-4 (on the side of the UE 2001) are continued to be performed until all objects 21 of the web page 20 have been received and rendered at the UE 2001, i.e., until download and rendering of the web page 20 is finally complete.

It is again noted that the method embodiment illustrated in FIG. 3 only reflects an exemplary signalling sequence between the UE 2001 and the object scheduler 2002. It will be understood that further variants of the signalling sequence are conceivable in the scope of the present disclosure.

In one respect, it will be understood that the privilege request may be sent at a different point of time. For example, the privilege request may be sent after a first portion of the web page 20 has been received at the UE 2001 and, more particularly, the privilege request may be sent at the start rendering time of the web page 20 in case the loading status of the content is not yet in the "interactive" state. At this point, the presenter 20016 of the UE 2001 is about to start rendering the web page 20 but no interactive objects are contained therein so far. Sending the privilege request to the object scheduler 2002 will then boost the subsequent transmission of the web page 20 in order to enable user interaction for the web page 20 as quickly as possible. In this case, the rendering status included in the privilege request may indicate that rendering has started and the loading status included in the privilege request may indicate that the UE 2001 is in the "interactive" state.

Further, it will be understood that changing the scheduling priority in step S2-4 to the default (or a lower) priority does not necessarily require preceding receipt of a termination request from the UE 2001. It is also conceivable that the scheduler 20025 of the object scheduler 2002 schedules a remaining portion of the objects 21 of the web page 20 with the default (or a lower) priority when a predetermined maximum period of time has elapsed after receiving the privilege request. This may guarantee that a boosted period does not exceed a predetermined amount of time and may ensure that a fair share of available transmission resources among a plurality of UEs in the access network is provided. Such behavior may be particularly beneficial for web pages that have a high percentage of rendering-blocking objects. If in these cases the termination request was sent not before the loading status of the web page has reached the "interactive" state, almost the whole web page download would be boosted which might be unfair to other UEs in the network.

Further, it is conceivable that the scheduler 20025 of the object scheduler 2002 schedules the remaining portion of the objects 21 with the default (or a lower) priority not until a predetermined minimum period of time has elapsed after receiving the privilege request. In this way, it may be guaranteed that a boosted period lasts for at least a predetermined amount of time. Such behavior may be beneficial for web pages that have a low percentage of rendering-blocking objects (such as Amazon or eBay, for example), where the non-blocking elements may be loaded quickly and the remaining objects may be loaded later by the main page. If in these cases the termination request was sent once the loading status of the web page has reached the "interactive" state (i.e., very quickly), there would be little gain in practice so that a minimum amount of boosted time should be guaranteed. As another criterion, it is also conceivable that the scheduler 20025 of the object scheduler 2002 schedules the remaining portion of the objects 21 with the default (or a lower) priority not until a predetermined percentage of objects of the content is transmitted to the UE (e.g. 75% of the objects of the web page to be downloaded).

Figure 4A:
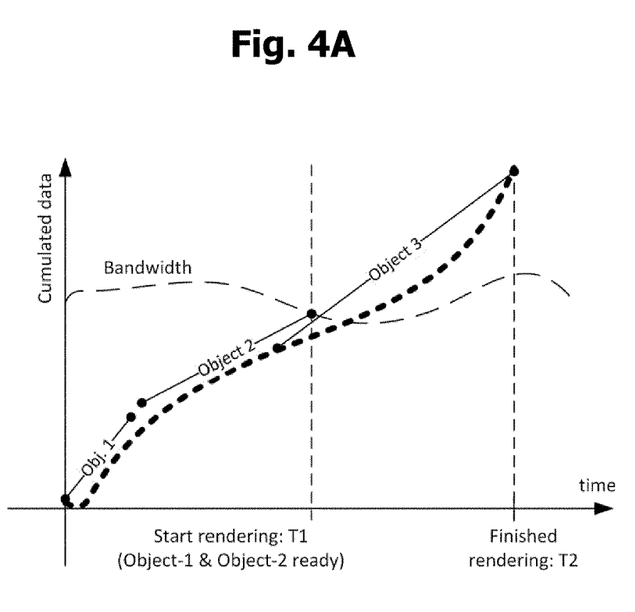
FIGS. 4A and 4B schematically show the start presentation time obtainable in the prior art vs. the start presentation time obtainable by the present technique.
Figure 4B:
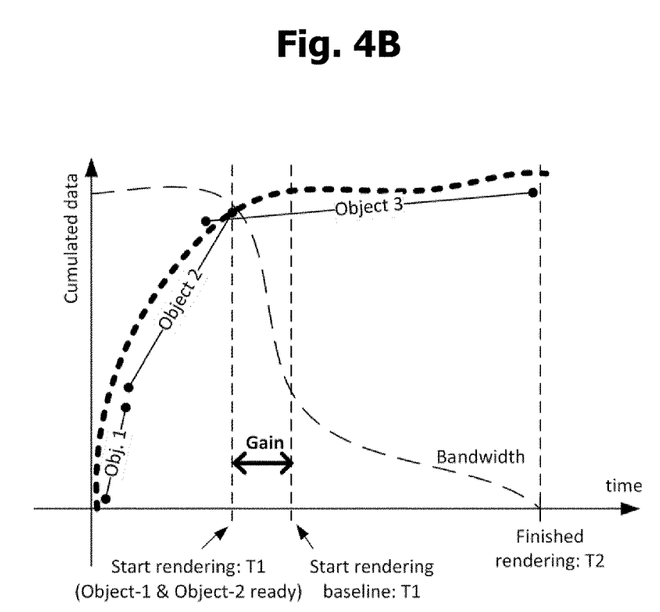

Finally, FIGS. 4A and 4B illustrate a comparison of the start presentation time obtainable in the prior art vs. the start presentation time obtainable by the present technique by means of an exemplary comparison of the start rendering time of a web page which includes three objects.

FIG. 4A shows the baseline of the start rendering time in network environments according to the prior art. Objects are downloaded in a conventional manner by a web browser running on the UE. The objects to be downloaded are scheduled for transmission with a default priority in the object scheduler of the access network. According to common scheduling algorithms, the received bandwidth remains substantially stable for the whole web page download time and, as a consequence, the cumulative data received at the UE corresponds to a substantially linearly increasing function. As shown in FIG. 4A, objects #1 and #2 influence the start rendering time T1 which is reached once the download of objects #1 and #2 is complete. At this time, object #3 is still subject to ongoing reception and rendering the web page is finished at time T2 after completion of the download of object #3.

In contrast thereto, FIG. 4B shows the case in which the present technique is deployed. Here, it is assumed that the privilege request is sent immediately with the download request so that the objects are scheduled with a higher priority than the default priority from the very beginning of the transmission. In this case, objects #1 and #2 are scheduled with higher priority in order to reduce the start rendering time T1 as compared to the prior art (see "Gain" in FIG. 4B). Due to the prioritized scheduling, objects #1 and #2 are downloaded with a higher bandwidth and consequently received faster at the UE (see the "Cumulated data" curve in FIG. 4B having a logarithm-like shape). Further, it is assumed that termination of the privileged transmission is triggered before scheduling object #3 for transmission. Object #3 is thus scheduled with a priority less than that of objects #1 and #2 and, hence, downloaded with a bandwidth lower than the previous objects.

As has become apparent from the above embodiments, by scheduling transmission of a portion of the plurality of objects with a higher priority than the default priority assigned by the object scheduler to the UE, transmission of the content as a whole is accelerated ("boosted") and the content may thus be presented to a user of the UE at an earlier point of time. Particularly, the start presentation time of the content on the UE (i.e., the moment at which a first portion of the content is presented to the user via a presentation interface of the UE) may be reduced and the user may be given a quicker feedback providing evidence that the UE is in fact responsive and that a requested download is in progress. In this way, the user of the UE is experiencing increased QoE.

Also, by sending the privilege request to the object scheduler and receiving—in response to the privilege request—a portion of the plurality of objects with a higher priority than the default priority assigned by the object scheduler to the UE, reception of the content as a whole is accelerated ("boosted") and the content may thus be presented to a user of the UE at an earlier point of time. Particularly, the start presentation time of the content on the UE (i.e., the moment at which a first part of the content is presented via the presentation interface to the user) may be reduced and the user may be given a quicker feedback providing evidence that the UE is in fact responsive and that a download is in progress. In this way, the user of the UE is experiencing increased QoE.

The present disclosure generally provides different advantages in different deployments. The proposed technique can be implemented in a protocol-independent manner. In terms of web page rendering, it may in fact be web browser-independent (since web rendering engines are typically shared across multiple web browsers and function similarly).

The proposed technique can be used to introduce a fair share of the transmission resources since all users may be assigned boosted and unboosted periods. In many variants, the parties involved (e.g., OTT, operator and end user) benefit from the improved QoE, even for end-to-end encrypted web traffic. Also, an incrementally deployable solution can be introduced that does not violate privacy, but reveals request priority to the network in order for the network operator to perform in-network traffic differentiation and so support goals of the executed applications. For the access network operator, a better utilization of existing capacity can be achieved while exhibiting improved QoE for end users. The total capacity that one user receives need not be altered but can be distributed in a smarter way. Advantages for Internet content/application provider include network support for their own prioritization, while ensuring best possible QoE for the end users. In certain variants, no implementation of the present technique is required on content server side, while support on the client side can be incrementally introduced.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. An object scheduler for scheduling transmission of content in an access network, wherein the content is provided by a content server for download to a user equipment (UE), the object scheduler comprising:
at least one memory storing program code; and
at least one processor configured to execute the program code, wherein execution of the program code configures the processor to:
schedule, in response to receipt of a privilege request from the UE requesting privileged transmission of content comprising a plurality of objects, transmission of the plurality of objects to the UE, wherein at least a portion of the plurality of objects is scheduled with a higher priority than a default priority assigned by the object scheduler to the UE;
schedule a remaining portion of the plurality of objects with the default priority no earlier than when a predetermined minimum period of time has elapsed after receiving the privilege request; and
trigger transmission of the scheduled plurality of objects to the UE.

2. The object scheduler of claim 1, wherein the privilege request includes at least one of information on a presentation status of the content in the UE and information on a loading status of the content in the UE.

3. The object scheduler of claim 2, wherein execution of the program code configures the processor to schedule the plurality of objects based on at least one of the presentation status and the loading status included in the privilege request.

4. The object scheduler of claim 1, wherein execution of the program code configures the processor to schedule, in response to receipt of a termination request from the UE requesting termination of the privileged transmission of the content, a remaining portion of the plurality of objects with the default priority.

5. The object scheduler of claim 1, wherein execution of the program code configures the processor to schedule a remaining portion of the plurality of objects with the default priority no later than when a predetermined maximum period of time has elapsed after receiving the privilege request.

6. The object scheduler of claim 1, wherein t execution of the program code configures the processor to obtain the privilege request from one of:
a dedicated socket between the UE and the object scheduler;
a Type of Service, ToS, field of IP packets sent by the UE; and
radio signalling via Minimization of Drive Tests, MDT.

7. The object scheduler of claim 1, wherein the objects are comprised in data traffic and the data traffic is encrypted.

8. A user equipment (UE) for enhancing presentation of received content, the UE comprising:
at least one presentation interface;
at least one memory storing program code; and
at least one processor configured to execute the program code, wherein execution of the program code configures the processor to:
trigger sending of a download request to a content server requesting download of a content comprising a plurality of objects;
trigger sending of a privilege request to an object scheduler of an access network requesting privileged transmission of the content;
trigger sending the privilege request at a presentation start time of the content if a loading status of the content is not yet in an interactive state; and
present the received content via the presentation interface, wherein at least a portion of the plurality of objects is received with a higher priority than a default priority assigned by the object scheduler to the UE.

9. The UE of claim 8, wherein the privilege request includes at least one of information on a presentation status of the content in the UE and information on a loading status of the content in the UE.

10. The UE of claim 8, wherein execution of the program code configures the processor to trigger sending the privilege request immediately with the download request.

11. The UE of claim 8, wherein execution of the program code configures the processor to trigger sending the privilege request before a presentation start time of the content.

12. The UE of claim 11, wherein the objects are comprised in data traffic and the data traffic is encrypted.

13. The UE of claim 8, wherein execution of the program code configures the processor to trigger sending of a termination request to the object scheduler requesting termination of the privileged transmission of the content.

14. The UE of claim 13, wherein execution of the program code configures the processor to trigger sending of the termination request no earlier than when a predetermined minimum period of time has elapsed after sending the privilege request.

15. The UE of claim 13, wherein execution of the program code configures the processor to trigger sending of the termination request no later than when a predetermined maximum period of time has elapsed after sending the privilege request.

16. The UE of claim 8, wherein a remaining portion of the plurality of objects is received with the default priority.

17. The UE of claim 8, wherein execution of the program code configures the processor to trigger sending the privilege request in one of:
- a dedicated socket between the UE and the object scheduler;
- a Type of Service (ToS) field of IP packets sent by the UE; and
- radio signalling via Minimization of Drive Tests (MDT).

18. A method for scheduling transmission of content, the method being performed in an object scheduler of an access network and comprising:
- receiving a privilege request from a user equipment (UE), requesting privileged transmission of a content comprising a plurality of objects, the content being downloaded to the UE from a content server;
- scheduling the plurality of objects to be transmitted to the UE, wherein at least a portion of the plurality of objects is scheduled with a higher priority than a default priority assigned by the object scheduler to the UE;
- scheduling a remaining portion of the plurality of objects with the default priority no earlier than when a predetermined minimum period of time has elapsed after receiving the privilege request; and
- transmitting the scheduled plurality of objects to the UE.

* * * * *